(12) United States Patent
Gupta

(10) Patent No.: US 7,093,025 B1
(45) Date of Patent: Aug. 15, 2006

(54) SMTP EXTENSION FOR EMAIL DELIVERY FAILURE

(75) Inventor: Deepak Gupta, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 09/679,212

(22) Filed: Oct. 4, 2000

(51) Int. Cl.
*G06F 15/173* (2006.01)
*G06F 15/16* (2006.01)

(52) U.S. Cl. .................. 709/239; 709/204; 709/206; 709/238

(58) Field of Classification Search ............... 709/203, 709/204, 206, 217, 218, 238, 239; 370/256
See application file for complete search history.

(56) References Cited

U.S. PATENT DOCUMENTS

| | | | |
|---|---|---|---|
| 5,473,602 A | * 12/1995 | McKenna et al. | 370/256 |
| 5,623,600 A | 4/1997 | Ji et al. | |
| 5,682,460 A | * 10/1997 | Hyziak et al. | 709/217 |
| 5,826,023 A | 10/1998 | Hall et al. | |
| 5,878,230 A | * 3/1999 | Weber et al. | 709/238 |
| 5,937,161 A | * 8/1999 | Mulligan et al. | 709/238 |
| 5,987,504 A | 11/1999 | Toga | |
| 6,035,104 A | * 3/2000 | Zahariev | 709/203 |
| 6,035,326 A | 3/2000 | Miles et al. | |
| 6,035,327 A | 3/2000 | Buckley et al. | |
| 6,108,709 A | * 8/2000 | Shinomura et al. | 709/239 |
| 6,163,809 A | * 12/2000 | Buckley | 709/204 |
| 6,282,574 B1 | * 8/2001 | Voit | 709/230 |
| 6,438,583 B1 | * 8/2002 | McDowell et al. | 709/206 |
| 6,480,484 B1 | * 11/2002 | Morton | 709/218 |
| 6,532,489 B1 | * 3/2003 | Merchant | 709/206 |
| 6,618,747 B1 | * 9/2003 | Flynn et al. | 709/206 |
| 6,643,687 B1 | * 11/2003 | Dickie et al. | 709/238 |

FOREIGN PATENT DOCUMENTS

| | | |
|---|---|---|
| EP | 0 940 967 A2 | 2/1999 |
| EP | 0 942 580 A2 | 3/1999 |
| WO | WO 98/32272 | 1/1998 |
| WO | WO 99/05814 | 7/1998 |
| WO | WO 99/27460 | 11/1998 |
| WO | WO 99/48054 | 3/1999 |
| WO | WO 00/33203 | 11/1999 |
| WO | WO 00/42747 | 1/2000 |

OTHER PUBLICATIONS

Klensin, J., "SMTP Service Extensions," *STD: 10, RFC: 1869*, MCI, Nov. 1995. www.cis.ohio–state.edu/cgi–bin/rfc/rfc1869.html.

Moore, K., "SMTP Service Extension for Delivery Status Notifications," *Standards Track, RFC: 1891*, University of Tennessee, Jan. 1996. www.cis.ohio–state.edu/cgi–bin/rfc/rfc1869.html.

Crocker, David H., "Standard for the Format of ARPA Internet Text Messages," RFC #822, Aug. 13, 1982. http://www.freesoft.org/CIE/RFC/Orig/rfc822.txt. Citation from JP: http://pa5000s/~doi/cgi–bin/emprint.cgi?file=rfc822.txt.

* cited by examiner

*Primary Examiner*—Rupal Dharia
*Assistant Examiner*—Quang N. Nguyen
(74) *Attorney, Agent, or Firm*—William H. Steinberg; Karuna Ojanen

(57) ABSTRACT

The present invention provides in a computing system including an email system connected to an email network using the SMTP (Simple Mail Transfer Protocol) protocol, a method for specifying alternate email recipients comprising:

specification of alternate recipients by the sender of an email message to be used in case the mail system can not deliver the message to the original recipient, delivery of the message to the specified alternate recipients by the email system in case it is unable to deliver to the original recipient.

The instant invention also provides a system and computer program product for carrying out the above method.

21 Claims, 2 Drawing Sheets

SMTP EXTENSION FOR EMAIL DELIVERY FAILURE

FIELD OF THE INVENTION

The invention relates to an extension to the SMTP protocol. More particularly, it relates to providing alternate addresses in case of failure of delivery in an email system.

BACKGROUND OF THE INVENTION

SMTP is a widely used and deployed protocol for E-mail over the internet. Though it has been very effective for mails, various extensions have been requested by Internet users and many have been suggested and implemented. too.

The current SMTP protocol uses the following keywords for simple mailing:
HELO to introduce yourself (helo <hostame>)
MAIL to specify the sender (MAIL FROM: <sender> [<parameters>])
RCPT to specify the recipients (RCPT TO: <recipient> [<parameters>]).
DATA to specify the message (ending with a dot in a single line)
(In MAIL and RCPT, parameters are ESMTP extensions)
The other keywords used are:
RSET to reset the system, NOOP for no operation, QUIT for exiting from SMT program, VRFY to verify an address (probably from an address book), EXPN (expand a name/mailing list etc), VERB for verbose mode, ETRN to run the queue.

To replace the MAIL command, three new commands have been defined:
SEND: This sends the mail directly to the users terminal.
SOML: This sends the mail to the users terminal and sends a mail if the user is not logged on.
SAML: This performs the function of both SEND and MAIL commands.

The SMTP protocol requires that an SMTP server provide notification of delivery failure, if it determines that a message cannot be delivered to one or more recipients. It comes to the sender of the mail as a normal Internet message containing an explanation of the error and the header of the failed message (or the full message). Usually this will contain the recipient it could not send the message to and the routing path. This requires sufficient information to be stored and returned to the sender. This is mentioned in the current protocols as DSN (Delivery Status Notification). This can be specified in the parameters of MAIL and RCPT commands as mentioned earlier.

For example
MAIL FROM: <sender> [RET={FULL|HDRS}][ENVID=<envid>]
RCPT TO: <recipient> [NOTIFY={NEVER,SUCCESS,FAILURE,DELAY}][ORCPT=<recipient>]
where RET is whether to return the full message or only headers, ENVID is the Sender's "envelope identifier" for tracking, NOTIFY is when to send the notification and ORCPT is the original recipient.

The Problem

The FAILURE on delivering mail is a nuisance for internet users. There can be numerous reasons for this. Undelivered messages cite various reasons like Mailbox full, or Relaying denied. Many times recipient mail servers reject mails from unauthorised domains or reject mails whose size exceeds a specified value. In other cases, people close their accounts or are removed by administrators (for example when an employee retires). Very frequently the servers themselves are down and the mails get returned. Sometimes the email address gets changed or the sender writes a wrong address. An example would be the change of id for a particular user.

Another problem is when people are out of office, they are unable to see their messages. This problem is partially alleviated using WAP. This enables people to access their mails while they are travelling or not in office through mobile phones and laptops. However, it still does not deal with the problem of returned mails. Also, not many people would be using this as it would be costly for them to do so. In many countries people do not even carry laptops or mobile phones, so the implementation of WAP is not feasible or would at least take some time to be helpful.

Lotus Notes mail system and maybe some others give the facility of forward i.e. forward all mails to a particular address when they put a Out of office notification. However, this also only partially solves the problem and is not effective when the server itself refuses the mail or the server is down or the email address is itself wrong.

As mentioned earlier, extensions have been made to the SMTP protocol in the past, for instance, U.S. Pat. No. 6,035,327 describes an extension to preserve per message and per recipient properties. However, none of these extensions till date addresses the problem of non-delivery of messages.

The object and summary of the invention:

The object of this invention is to obviate the above drawbacks and specify alternate email recipients.

To achieve the said objectives this invention provides a computing system including an email system connected to an email network using the SMTP (Simple Mail Transfer Protocol) protocol characterized in that the said system includes:
  means for the sender to specify alternate recipients of an email message to be used in case the mail system can not deliver the message to the original recipient,
  means for said email system to deliver the message to the specified alternate recipients in case it is unable to deliver to the original recipient.

The said means for the sender to specify the alternate recipient is by addition of ARCPT (Alternate Recipient) parameter in said SMTP protocol.

The means for delivering the message to the specified alternate recipients is an extension to the SMTP server to include automatic forwarding of the message to the alternate recipients in case of inability to deliver to original recipients.

The said means for specifying the alternate recipient using the said ARCPT parameter can also be used by the recipient or the system administrator of the recipient server to forward emails to another address and alternate recipient on the recipient server shall hold priority over the one already in the email specified by the sender.

The above system further comprises:
  means for the sender to specify notification by said email system of the successful delivery to the alternate recipients on failure to deliver to original recipient,
  means for said email system to notify the sender based on the non-delivery of the message to the alternate recipients.

The said means for the sender to specify the notification is by addition of ALTERNATE keyword to the NOTIFY parameter.

The said means for the said email system to notify the sender is an extension of the SMTP server to include sending of an email message to the sender in case of non-delivery of the message to the alternate recipients.

The above system further includes:

ARCPT keyword for specifying alternate recipients,

ALTERNATE keyword in the NOTIFY parameter, for specifying notification in case of delivery to alternate recipients.

The present invention further provides in a computing system including an email system connected to an email network using the SMTP (Simple Mail Transfer Protocol) protocol, a method for specifying alternate email recipients comprising:

specification of alternate recipients by the sender of an email message to be used in case the mail system can not deliver the message to the original recipient, delivery of the message to the specified alternate recipients by the email system in case it is unable to deliver to the original recipient.

The specification of the alternate recipient is by ARCPT (Alternate Recipient) parameter in said SMTP protocol.

The delivery of the message to the specified alternate recipients is an extension to the SMTP server to include automatic forwarding of the message to the alternate recipients in case of inability to deliver to original recipients.

The specification of the alternate recipient using the said ARCPT parameter can also be provided by the recipient or the system administrator of the recipient server to forward emails to another address and alternate recipient on the recipient server shall hold priority over the one already in the email specified by the sender.

The above method further comprises:

specification by the sender of notification by said email system of the successful delivery to the alternate recipients on failure to deliver to original recipient, notification to the sender by the email system based on the non-delivery of the message to the alternate recipients.

The specification of the notification is by addition of ALTERNATE keyword to the NOTIFY parameter.

The said notification to the sender is by an extension of the SMTP server to in, dude sending of an email message to the sender in case of non-delivery of the message to the alternate recipients.

The said method further includes:

ARCPT keyword for specifying alternate recipients,

ALTERNATE keyword in the NOTIFY parameter, for specifying notification in case of delivery to alternate recipients.

The instant invention further provides a computer program product comprising computer readable program code stored on computer readable storage medium embodied therein for causing a computer to send email to alternate email recipients in case of inability to deliver to original recipient comprising computer readable program code means configured for enabling the sender to specify alternate recipients of an email message to be used in case the mail system can not deliver the message to the original recipient, computer readable program code means configured for causing the said email system to deliver the message to the specified alternate recipients in case it is unable to deliver to the original recipient.

The said computer readable program code means configured for specifying the alternate recipient is by addition of ARCPT (Alternate Recipient) parameter in said SMTP protocol.

The computer readable program code means configured for delivering the message to the specified alternate recipients is an extension to the SMTP server to include automatic forwarding of the message to the alternate recipients in case of not delivering to original recipients.

The computer readable program code means configured for enabling the recipient or system administrator of the recipient server to specify an alternate email address using ARCPT parameter to forward emails to another address with the alternate recipient on the recipient server holding priority over the one already in the email specified by the sender.

The above computer program product further comprises:

computer readable program code means configured for enabling the sender to specify notification by said email system of the successful delivery to the alternate recipients on failure to deliver to original recipient, computer readable program code means configured for causing said email system notify the sender based on the non-delivery of the message to the alternate recipients.

The said computer readable program code means configured for specifying the notification is by addition of ALTERNATE keyword to the NOTIFY parameter.

The said computer readable program code means configured for notify the sender is an extension of the SMTP server to include sending of an email message to the sender in case of non-delivery of the message to the alternate recipients.

The said computer readable program code means further includes:

ARCPT keyword for specifying alternate recipients,

ALTERNATE keyword in the NOTIFY parameter, for specifying notification in case of delivery to alternate recipients.

BRIEF DESCRIPTION OF THE DRAWINGS

The invention will now be described with reference to accompanying drawings and examples.

DETAILED DESCRIPTION OF THE DRAWINGS

Figure 1A:
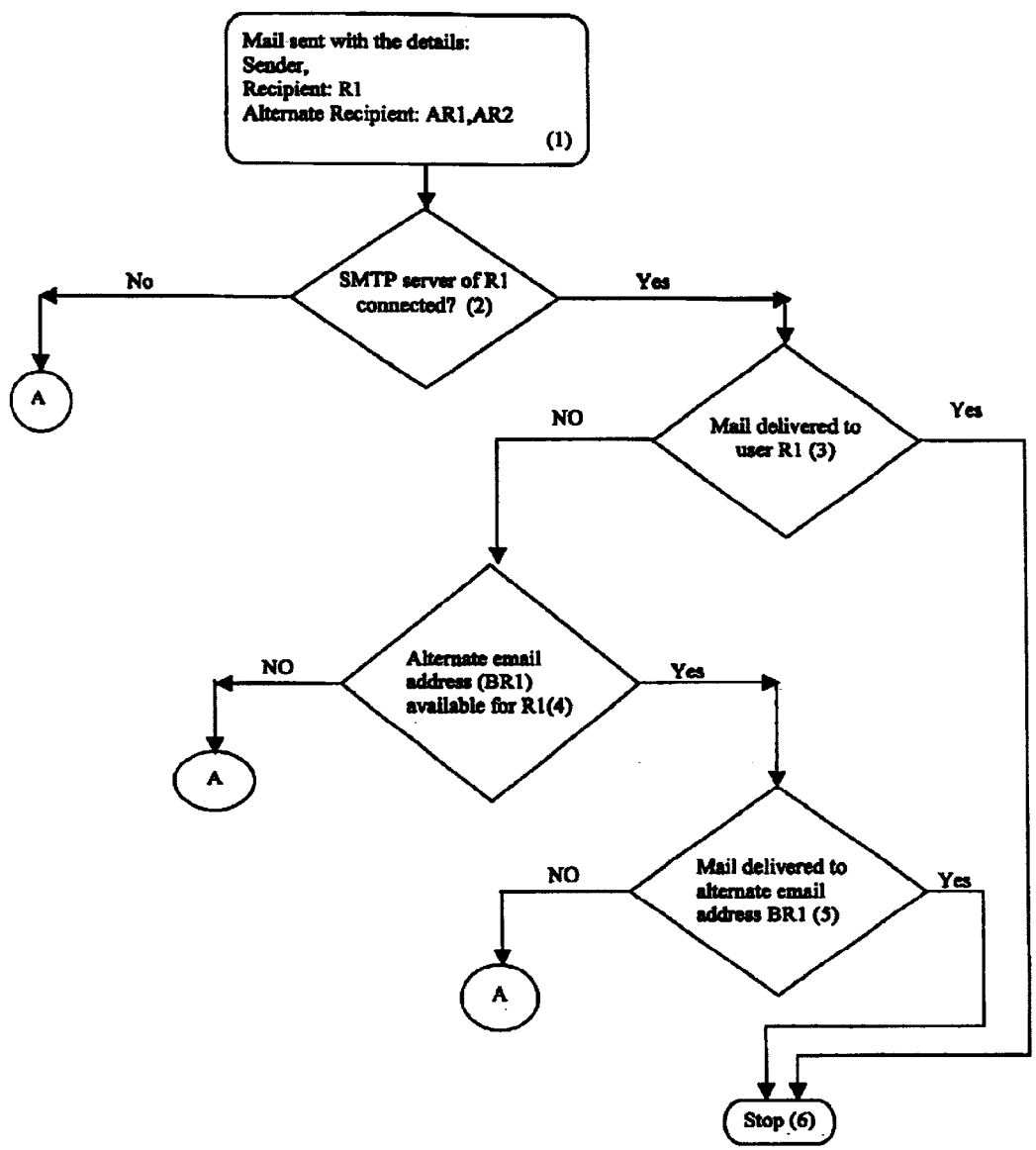
FIG. 1 shows the flow diagram of the system, according to this invention
Figure 1B:
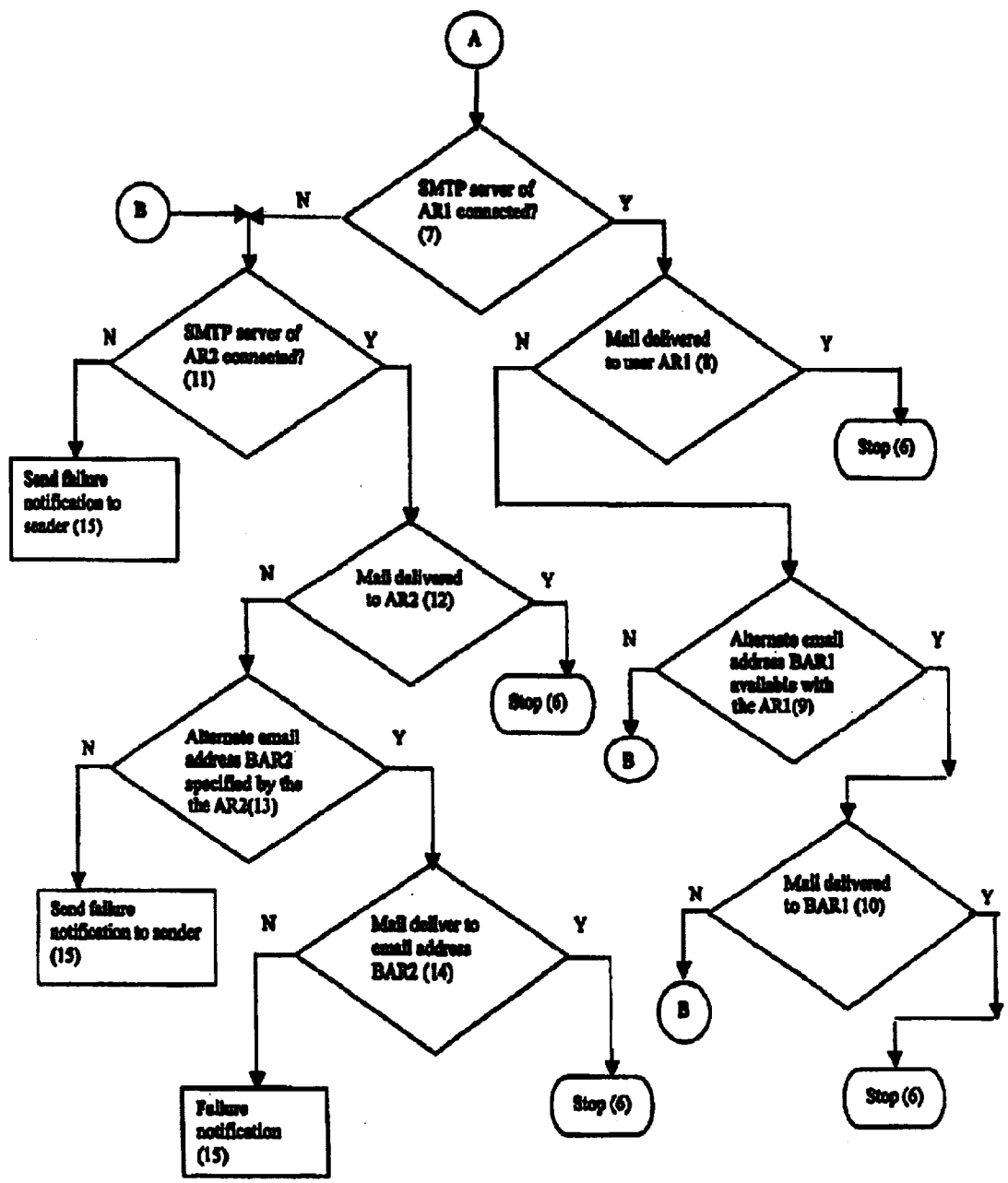

The sender specifies the recipient address R1 with two alternate recipients AR1 and AR2 (1). The SMTP server of the sender tries to contact the SMTP server of recipient R1 (2). In case it is able to do so, it tries to deliver the mail to recipient R1 (3). In case of failure to deliver mail, the system checks for alternate email address BR1 if specified by recipient R1 (4). If such an alternate email address is specified, the system attempts to deliver the mail to alternate email address (5). If the attempt is successful the activity is complete (6).

If the system is unsuccessful in the above attempts it attempts to connect to the server of AR1 (7). In case it is able to do so, the system attempts to deliver the mail to user AR1 (8). If the attempt is successful, the process is complete (6). Otherwise, the system checks for an alternate email address BAR1, if specified by AR1 recipient (9). If BAR1 is specified, the system attempts to deliver to it (10). If successful, the process is complete (6).

If the system is unsuccessful at any point above the SMTP server tries to connect to the SMTP server of alternate recipient AR2 (11). If the attempt is unsuccessful a failure notification is issued (15). If the connection is successful, the system attempts to deliver the mail to AR2 (12). If the attempt fails, the system checks for an alternate address specified by AR2 (13). If no alternate address has been specified the system issues a failure notification (15). If however, an alternate address is available the system attempts BAR2 delivery of the mail to BAR2. If successful, the process is complete (6), else a failure notification is issued (15).

The RCPT will have a new parameter ARCPT (Alternate recipient) which will correspond to each RCPT address. There can be more than one ARCPT for one RCPT separated by commas. In case there are more than one ARCPT specified, the first one will be used, on failure to deliver to even that address the second one will be used and so on.

The NOTIFY parameter will have a new value that it can take which would be ALTERNATE
NOTFY={NEVER,SUCCESS,ALTERNATE,FALURE, DELAY}

NEVER: The sender will never be notified.
SUCCESS: The sender will be notified on successful delivery of the mail to the original recipient.
ALTERNATE: The sender will be notified on successful delivery of the mail to the alternate recipient. (which implies it failed to deliver it to the original recipient).
FAILURE: The sender will be notified in case the mail cannot be delivered to the alternate recipient as well (or to the original recipient in case ARCPT is not specified).
DELAY: In case there is a delay (same as current implementation)

For example—
MAIL FROM: <abc@abc.com> [RET={FULL}]
RCPT TO: <xyz@xyz.com> [NOTIFY={ALTERNATE, FAILURE}][ORCPT=<abc@abc.com>][ARCPT= <rst@rst.com>]

Case I: The Server xyz.com is Found and Accepts the Mail, and the User xyz is Found
  The mail is delivered to xyz@xyz.com
Case II: The Server xyz.com is Found and Accepts the Mail, and the User xyz is Not Found but has an Alternate Email Specified
  The mail is delivered to the alternate email (on failure it is treated as Case V)
Case III: The Server xyz.com is Found and Rejects the Mail, the User xyz is Found and has an Alternate Email Specified
  The mail is delivered to the alternate email. (on failure it is treated as Case IV)
Case IV: The Server xyz.com is Found and Rejects the Mail, the User xyz is Found Without an Alternate Email Specified
  The mail is delivered to the address rst@rst.com.
Case V: The Server xyz.com is Found and Accepts the Mail the User xyz is Not Found and No Alternate Email is Also Available
  The mail is delivered to the address rst@rst.com
Case VI: The Server xyz.com is Not Found.
  The mail is delivered to the address rst@rst.com In any of the above cases, if the mail is delivered to rst@rst.com the sender is notified. If delivery to this server also fails, the same steps are followed as for xyz server. In case everything fails, the sender is notified.

Advantages:
  The failure notification only comes in case of genuine failures. The best attempt is made to deliver the message to the recipient.
  The users can specify their alternate emails in case they wish to receive mails somewhere else under situations of abnormality.
  The sender has the option of routing the email to alternate recipients if the original recipient cannot be reached and thereby have the message attended to.

The proposed solution solves all the problems mentioned above as the alternate email is used in case of failure of delivery of the mail to the original recipient. This decreases the probability of failure substantially.

What is claimed is:

1. A computing system including an email system connected to an email network using the SMTP (Simple Mail Transfer Protocol) protocol, the computing system comprising: an extended alternate recipient parameter in the SMTP protocol within a self-rerouting email message that specifies alternate recipients to be used in case the email system cannot deliver the self-rerouting email message to an original recipient, and to automatically attempt to forward the self-rerouting email message to the alternate recipients in case the self-rerouting email message cannot be delivered to the original recipient.

2. A system as in claim 1 wherein the extended alternate recipient parameter is an ARCPT (Alternate Recipient) parameter in said SMTP protocol.

3. A system as in claim 1 wherein the extended alternative recipient parameter within the self-rerouting email message can also be used by the recipient or the system administrator of the recipient server to forward email messages to another address and the alternate recipient on the recipient server shall hold priority over the one already in the email specified by the sender.

4. A system as in claim 1 further comprising a second extended alternate keyword to an SMTP protocol NOTIFY parameter for the sender to specify notification by said email system of successful delivery to the alternate recipients on failure to deliver to the original recipient, and to notify the sender based on the delivery of the self-rerouting email message to the alternate recipients.

5. A system as in claim 4 wherein the second extended alternate keyword is ALTERNATE in the SMTP NOTIFY parameter.

6. A system as in claim 4 wherein the second extended alternate keyword is an extension of the SMTP protocol NOTIFY parameter to include sending a second email message to the sender in case of non-delivery of the self-rerouting email message to the alternate recipients.

7. A system as in claim 4 wherein the second extended alternate keyword is an extension of the SMTP protocol NOTIFY parameter to specify notification in case of delivery to alternate recipients.

8. In a computing system including an email system connected to an email network using the SMTP (Simple Mail Transfer Protocol) protocol, a method for specifying alternate email recipients comprising: providing an extended alternate recipient parameter in the SMTP protocol that makes an email message a self-rerouting email message that specifies alternate recipients to be used in case the email system cannot deliver the self-rerouting email message to the original recipient and attempting to deliver the self re-routing email message to the specified alternate recipients in case the email system is unable to deliver to the original recipient.

9. A method as in claim 8 wherein the extended alternate recipient parameter in the SMTP protocol within the self-rerouting email message is an ARCPT (Alternate Recipient) parameter.

10. A method as in claim 8 wherein the step of attempting to deliver the self-rerouting email message further comprises automatic forwarding the self-rerouting email message to the alternate recipients in case of inability to deliver to the original recipient.

11. A method as in claim 9, wherein the step of providing an extended alternative recipient parameter in the SMTP protocol within the self-rerouting email message further comprises the alternate recipient on the recipient server having priority over the original recipient specified by the sender.

12. A method as in claim 8 further comprising:
   (a) specifying notification by said email system of the successful delivery to the alternate recipients on failure to deliver to the original recipient, or
   (b) notifying the sender by the email system of the non-delivery of the message to the alternate recipients.

13. A method as in claim 12 wherein the step of providing notification is specifying an ALTERNATE extension to the NOTIFY parameter.

14. A method as in claim 12 wherein the step of notifying the sender by the email system of the non-delivery of the self-rerouting message to the alternate recipients further comprises sending an second email message to the sender in case of non-delivery of the self-rerouting message to the alternate recipients.

15. A computer program product comprising computer readable program code stored on computer readable storage medium embodied therein for causing a computer to send email to alternate email recipients in case of inability to deliver to an original recipient comprising: computer readable program code configured for extending the SMTP protocol within an email message to enable the sender to specify alternate recipients of the email message to be used in case the mail system cannot deliver the email message to the original recipient thereby making the email message a self-rerouting email message, and to cause the mail system to attempt to deliver the self-rerouting email message to the specified alternate recipients in case it is unable to deliver to the original recipient.

16. A computer program product as in claim 15 wherein said computer readable program code configured for extending the SMTP protocol within the self-rerouting email message is an ARCPT (Alternate Recipient) parameter in said SMTP protocol.

17. A computer program product as in claim 15 wherein said computer readable program code configured for extending the SMTP protocol thereby causing the mail system to attempt to deliver the self-rerouting email message to the specified alternate recipients further comprises automatic forwarding the self-rerouting email message to the alternate recipients in case of not delivering to original recipients.

18. A computer program product as in claim 16 wherein said computer readable program code configured for extending the SMTP protocol by the addition of the ARCPT parameter enables the recipient or system administrator of a server of the recipient to forward email messages to another address with the alternate recipient on the server of the recipient holding priority over the recipient in the self-rerouting email specified by the sender.

19. A computer program product as in claim 15 further comprising: computer readable program code configured to extend the SMTP protocol to enable the sender to specify notification by said mail system of a successful delivery to the alternate recipients on failure to deliver to the original recipient, and to cause said mail system to notify the sender based on the non-delivery of the self-rerouting email message to the alternate recipients.

20. A computer program product as claimed in claim 19 wherein said computer readable program code configured for specifying the notification is by addition of ALTERNATE keyword to the NOTIFY parameter.

21. A computer program product as claimed in claim 16 further comprising computer readable program code that extends the SMTP protocol with an ALTERNATE keyword in the NOTIFY parameter, for specifying notification in case of delivery to alternate recipients.

* * * * *